United States Patent [19]

Bram

[11] 4,194,769
[45] Mar. 25, 1980

[54] DEVICE FOR THE TENSILE LOCKING OF PIPE ELEMENTS

[75] Inventor: Georges E. Bram, Pont-a-Mousson, France

[73] Assignee: Pont-A-Mousson S.A., Nancy, France

[21] Appl. No.: 815,404

[22] Filed: Jul. 13, 1977

[30] Foreign Application Priority Data

Jul. 13, 1976 [FR] France .................. 76 21442

[51] Int. Cl.² .............. F16L 17/00; F16L 21/08; F16L 23/02; F16L 27/00
[52] U.S. Cl. .................... 285/184; 285/321; 285/374; 285/403; 285/415
[58] Field of Search ............ 285/231, 232, 233, 230, 285/184, 321, 23, 404, 374, 400, 403, 284, 368, 415

[56] References Cited

U.S. PATENT DOCUMENTS

| 1,962,401 | 6/1934 | McWane | 285/374 X |
| 2,145,645 | 1/1939 | Byers | 285/403 X |
| 2,587,475 | 2/1952 | Hudson | 285/374 X |
| 3,159,414 | 12/1964 | Widman | 285/403 X |
| 3,433,509 | 3/1969 | Jeffery et al. | 285/374 |
| 3,684,320 | 8/1972 | Platzer et al. | 285/403 X |
| 3,844,589 | 10/1974 | Bram | 285/231 X |
| 3,884,510 | 5/1975 | Bram | 285/321 X |

FOREIGN PATENT DOCUMENTS

| 2205000 | 8/1973 | Fed. Rep. of Germany | 285/321 |
| 2417895 | 10/1975 | Fed. Rep. of Germany | 285/374 |
| 1318671 | 1/1963 | France | 285/374 |

Primary Examiner—Ramon S. Britts
Assistant Examiner—Carl F. Pietruszka
Attorney, Agent, or Firm—Sughrue, Rothwell, Mion and Zinn and Macpeak

[57] ABSTRACT

The device is provided for a coupling which comprises an annular sealing element interposed and compressed radially between the socket of one pipe element and the male end of the other pipe element. The pipe elements are capable of having an angular deviation therebetween. The device comprises an annular shoulder integral with the male end which shoulder is disposed, in the assembled state of the coupling, between an inner flange at the entrance of the socket and the sealing element. A split ring surrounds the male end between the flange and the shoulder. Screws engaged with and extending through tapped passages arranged circumferentially around and carried by the flange bear against a face of the shoulder so as to apply the ring against the shoulder.

7 Claims, 7 Drawing Figures

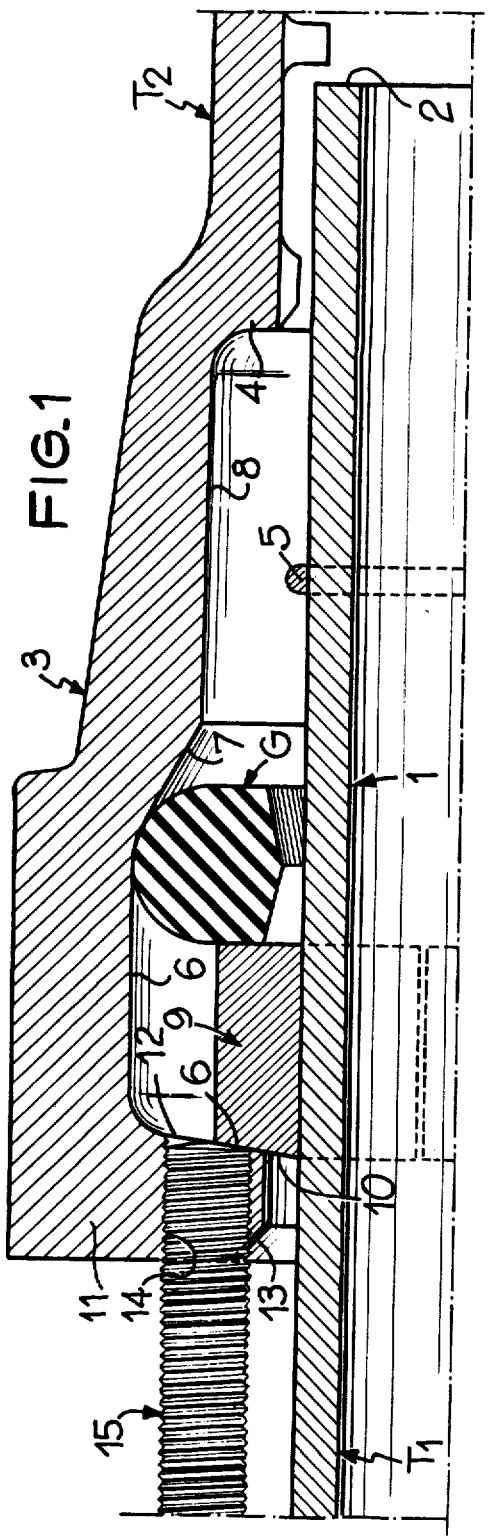
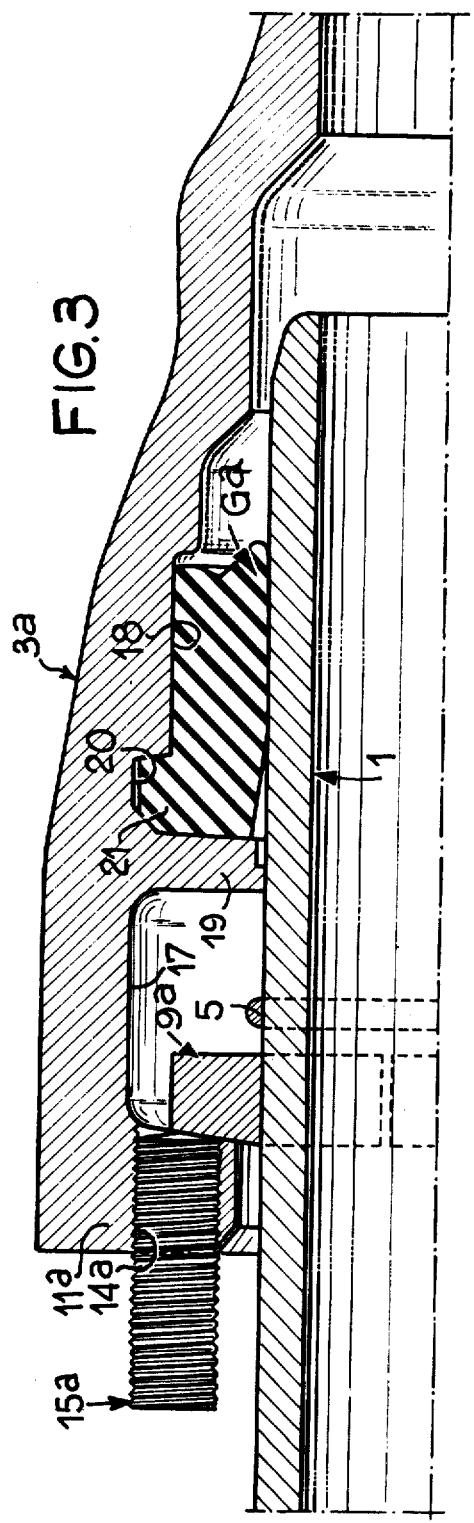

DEVICE FOR THE TENSILE LOCKING OF PIPE ELEMENTS

The present invention relates to devices for the tensile locking of pairs of pipe elements, one of which is provided with a male end and the other with a socket, comprising an annular sealing element which is radially compressed between the pipe elements, the pipe elements being capable of having an angular deviation therebetween, these devices, which provide an independent locking of the seal, being of the type comprising a shoulder provided on the male end and disposed, in the assembled state of the coupling, between an inner radial flange at the entrance of the socket and the sealing element, and a ring which is axially split and applied around the male end between the flange of the socket and the shoulder of the male end and bearing against said shoulder under the effect of spacing or bracing means disposed between the flange and the ring.

A device of this type is known, for example, from French Pat. No. 2,159,581, in which the spacing means are constituted by a mass of filler for example of epoxy resin which occupies the cavity of the socket around the male end and extends axially at least between the flange and the ring if not to the inner end of the socket.

However, such a device requires delicate pouring operations, above all when it must be placed in position in trenches and therefore requires skilled workmen.

An object of the present invention is therefore to provide a locking device which is essentially mechanical and can therefore be employed by unskilled workmen while preserving, if need be, a very even distribution of the locking force, that is to say of the reciprocal bearing of the locking parts, throughout the periphery of the pipe, irrespective of the angular deviation between the pipe elements to within allowable limits.

According to the invention, there is provided a locking device of the aforementioned type, wherein the flange of the socket comprises axial tapped passages arranged on the periphery of the socket and the spacing means are constituted by screws engaged in said passages of the flange and bearing against the ring on the side of the ring remote from the shoulder of the male end.

This device consequently has a mechanical structure which is very easy to employ and it permits, by the provision of a sufficiently high number of available tapped passages, the choice of the number of screws to be engaged through the flange of the socket in accordance with the exact measurement of the axial thrust to be balanced. For example, there are all the intermediate cases between that of rectilinear sections of a pipe which requires no locking and that of elbows or T's in respect of which, in the absence of thrust blocks, a more or less considerable locking is required, depending on the pressure of the fluid and the diameter, for balancing the axial thrust which occurs in these changes in pipe direction.

It has a particularly advantageous application when the socket comprises a single cavity having in succession two chambers which are of different diameters (the larger diameter chamber being adjacent the entrance of the socket) and interconnected by a frustoconical ramp, the smaller chamber being provided for the final housing of the sealing element after it has been forced from the other chamber from an unstressed waiting position. Indeed, in this case the bearing ring and the screws serve in a first stage to exert this axial thrust on the sealing element to urge it into the final cavity therefor.

Further features and advantages of the invention will be apparent from the ensuing description, given by way of non-limitative examples, with reference to the accompanying drawings in which:

FIG. 1 is a diametral and partial half-sectional view of a locking device according to the invention in a first application thereof, before screwing the screws through the flange;

FIG. 3 is a view similar to FIG. 1, before the screwing of the screws in a second application of the device;

Figure 2:
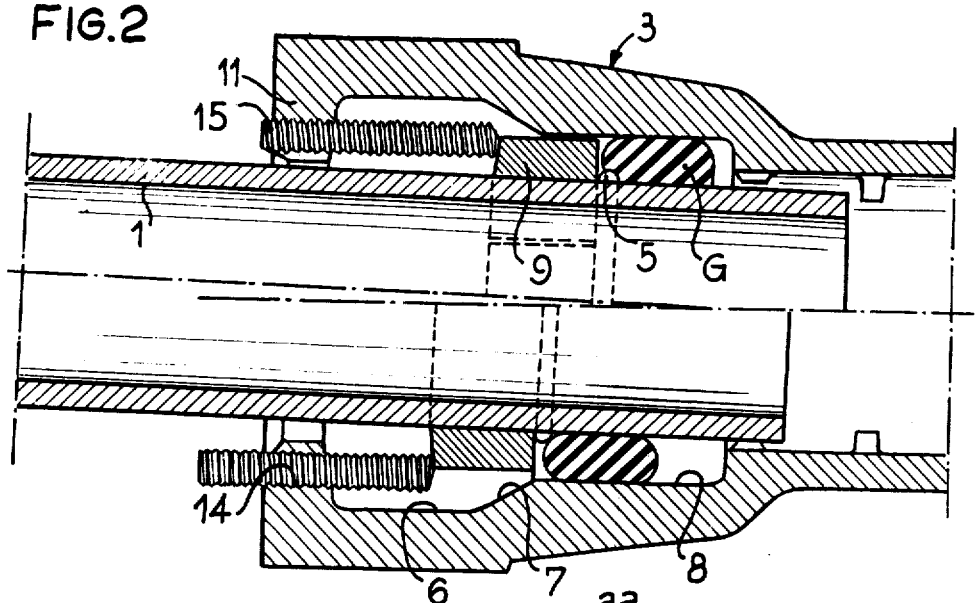
FIG. 2 is a corresponding view of the device after the screws have been screwed, this view being to a smaller scale and symmetrical with a part cut away, there being an angular deviation between the pipe elements.

The locking device shown in FIGS. 1 and 2 concerns two pipe elements of metal, for example cast iron, one element $T_1$ being provided with a male end 1 having an end edge 2 and the other element $T_2$ having a socket 3 the inner end of which is constituted by an inner shoulder 4 which surrounds the male end.

The male end 1 has an abutment projection 5. This abutment projection is, in the illustrated embodiment, a simple weld bead provided on the pipe in the factory.

The socket 3 has in the known manner, as for example shown in French Pat. No. 70-22,036, a single cavity having diameters which progressively decrease inwardly of the socket. A first cylindrical chamber 6 of rather large diameter—roughly equal to the outside diameter of the sealing element in the state of rest, that is to say, in the uncompressed state—is connected by a frustoconical ramp 7 to a second cylindrical chamber 8 which extends to the inner end 4 of the socket. This arrangement permits placing in position, with a radial compression, a sealing element G of flexible material, for example of rubber or other elastomer, after the male end 1 has been placed in the socket 3. The outer half-section of this outer sealing element is semicircular whereas its inner half-section has two radial sides interconnected by a double chamfer or bevel having a very wide angle of the order of 140°, and the minimum inside diameter thereof, corresponding to the edge of the double chamfer, exceeds the outside diameter of the male end 1 and is of the order of magnitude of the outside diameter of the weld bead 5. When placed in its waiting position in the uncompressed state (FIG. 1) in the chamber 6, this sealing element G is forced, in a manner which will be explained hereinafter, along the ramp 7 so that it is radially compressed until it is fully disposed in the chamber 8 in the radially compressed state between the socket 3 and the male end 1 (FIG. 2).

The abutment projecting portion or weld bead 5 is located at a distance from the end edge 2 of the male end which is such that, when the coupling has been made (FIG. 2), it is located completely beyond the ramp 7 of the socket adjacent to the inner end of the latter, irrespective of the angular deviation of the pipe element within allowable limits.

There is also provided a metal ring 9 whose section is roughly rectangular, apart from a chamfer or bevel mentioned hereinafter and elongated in the axial direction and surrounds the male end 1 while elastically gripping the latter owing to the fact that its inside diameter is slightly less than the outside diameter of the male end and that it is axially split so that its inside diameter is capable of being increased to permit the passage of the projecting portion 5 when the male end is inserted into the socket. In the expanded position of the ring 9, a block (not shown) maintains the edges of the slit spaced apart. The outside diameter of the ring, when it grips the male end, is slightly less than the inside diameter of the chamber 8 so as to be capable of entering the latter as will be understood hereinafter. The face 10 of the ring facing the entrance of the socket has a slight chamfer or bevel of about 5 to 10°, the point of the chamfer being adjacent to the axis of the ring.

The socket has at its entrance a bearing projecting portion constituted by an inner radial flange 11 which closes the socket cavity and has an inside diameter which is roughly intermediate between the inside and outside diameters of the ring 9. The inner face 12 of this flange has a slight inclination which corresponds to that of the face 10 of the ring 9. A chamfer or bevel 13 on the outer corner of this flange facilitates the centering of the male end when inserting it into the socket. The flange 11 is provided with axial tapped apertures 14 whose axes are at a distance from the axis of the socket which roughly corresponds to the outside diameter of the ring 9. For the requirements of the positioning of the sealing element explained hereinafter, these apertures are at least three in number. For locking, these three apertures are completed by a number of apertures adapted to the axial thrust that it is desired to balance. These tapped apertures have, extending therethrough, screws 15 the engagement of which permits exerting a thrust on the ring 9. The point 16 of these screws is machined in the form of a cone the angle of which also corresponds to the angle of the chamfer of the ring 9. This contact on frustoconical surfaces produces a radial reaction which, when the expanding block for the ring 9 has been removed, applies this ring on the whole of the periphery of the male end and permits a perfectly even thrust to be exerted on the sealing element G toward the chamber provided therefor.

The coupling just described is assembled in the following manner:

The ring 9 is first deformed in the form of a helix, so as to enable it to pass through the flange 11, and then expanded by means of the block and disposed in the first chamber 6 of the socket. The sealing element G is then inserted and placed in a waiting position in the same chamber 6 near to the ramp 8. The male end 1 is inserted into the assembly and its projecting portion 5 easily passes inside the ring 9 and the sealing element G. The block for expanding the ring 9 is then withdrawn and this causes the ring to come into contact with the male end 1. The ring 9 is then urged axially by means of the screws 15 and this ring urges the sealing element G inwardly of the socket. The sealing element is compressed as it travels along the ramp 7 and reaches the annular space between the chamber 8 and the male element 1. It easily passes over the projecting portion 5 which produces only a very localised deformation and takes up its final position in the chamber 8 behind the projecting portion 5. The locking starts as soon as the ring 9 is in contact with the projecting portion 5.

It can be seen in FIG. 2 that, even in the case of an angular deviation between the pipe elements, the ring 9 closes the entrance of the chamber 8 so that the sealing element G cannot be rejected into the chamber 6 in the uncompressed state by the pressure of the fluid flowing in the pipe. The chamber 8 is therefore sufficiently long to receive not only the sealing element G and the projecting portion 5 but also a notable part of the ring 9 corresponding to the penetration of the latter in the case of a maximum allowable angular deviation of the pipe elements. It is necessary that the axial dimension of the ring 9 be sufficient to ensure that, in the same position corresponding to the maximum deviation, the part of the ring 9 which penetrates the most the chamber 8 at one and projects sufficiently out of the chamber at the other end of the ring to allow the screws 15 located in this part to still bear against the face 16 notwithstanding the presence of the ramp 7.

In order to ensure a regular progression of the sealing element G and also to ensure a locking under good conditions, it is preferable to employ at the start only three screws 15 which are evenly spaced apart on the flange 11. In this way there is at the start of the locking a uniform contact between the ring 9 and the projecting portion 5 irrespective of the angular deviation between the pipe elements within the predetermined allowable limits. Such a deviation merely results in different extents of projection of the three screws so as to urge the ring 9 until it contacts the projecting portion 5. Once contact has been achieved, the number of additional screws required is added so that the section of material that they oppose to a possible return of the male end be sufficient for balancing the expected thrust from the service pressure which will prevail in the pipe.

Figure 4:
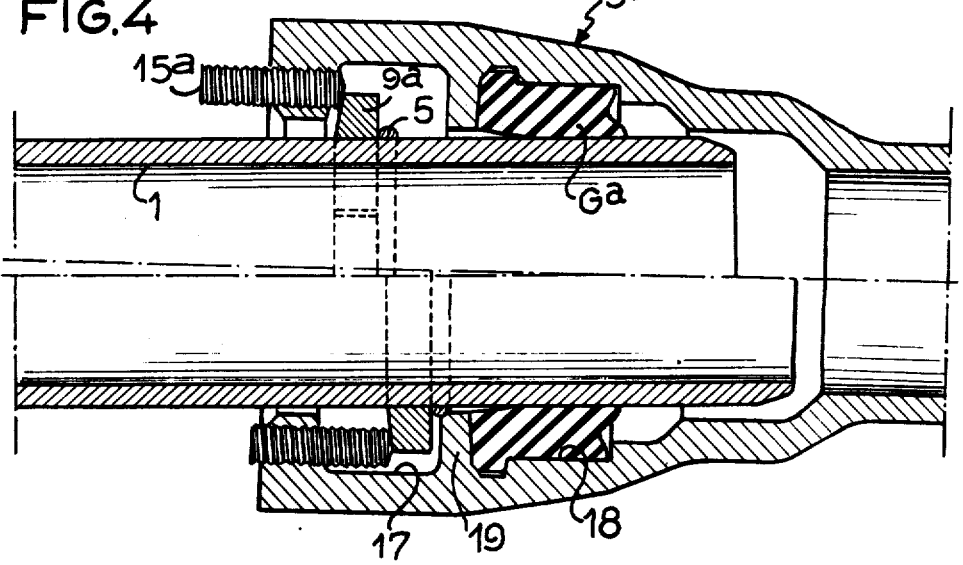
FIG. 4 is a view similar to FIG. 2 in respect of this second application after the screwing of the screws through the flange.

FIGS. 3 and 4 illustrate the application of the same locking device to a coupling comprising a sealing element of the radially compressed type placed in position independently. In this case, the sealing element $G^a$ immediately occupies its final position in the socket $3^a$. The latter has two chambers, namely one a locking chamber 17 and the other a sealing element chamber 18, the chambers being separated by an inner radial flange 19 surrounding the male end 1. The chamber 18 receives the sealing element $G^a$ and has adjacent to the flange 19 a groove 20 which receives a heel portion 21 of the sealing element, the heel portion retaining the latter and preventing it from being shifted when the male end is inserted into the socket, since it comprises a thick inner portion whose diameter is less than the outside diameter of the male end. The flange 19 holds the sealing element $G^a$ in position when the pipe is in service and prevents it from being expelled under the effect of the pressure prevailing in the annular space remaining at the end of the socket.

The chamber 17 of the socket is also closed in this case by a flange $11^a$ provided with tapped apertures $14^a$ in which screws $15^a$ are engaged. The axial distance between the two flanges $11^a$ and 19 is sufficient to enable the ring $9^a$ to assume an inclination corresponding to the maximum allowable angular deviation between the pipe elements. The axial dimension of the ring $9^a$ may be rather distinctly less than that of the ring 9, since, in this case, there is no requirement of penetration of the ring in the second chamber so that this ring $9^a$ has a roughly square section apart from the chamfer.

The assembly of this device will be described only in respect of the operations which distinguish it from the preceding device.

The male end 1 stops when the projecting portion 5 encounters the flange 19 at a point of its circumference. The flange 19 indeed has an inside diameter less than the outside diameter of this projecting portion. The subsequent movement of the ring $9^a$ merely corresponds to a clamping exerted by the screws $15^a$ for the purpose of locking the device. This movement is also produced by the three screws then, as soon as a perfectly circumferential contact has been obtained between the ring $9^a$ and the projecting portion 5, the required number of additional screws is added.

In the two illustrated embodiments, there is thus produced a perfectly distributed locking irrespective of the angular deviation between the pipe elements.

The simplicity of use of the device will be above all observed, since the annular parts are place in position in the socket before the insertion of the male end and, thereafter, there merely remain the screwing operations through the end flange of the socket.

Figure 5:
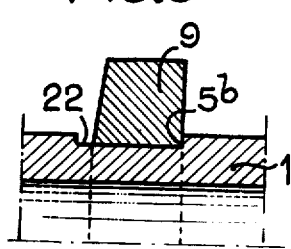
FIG. 5 is a partial view of a modification of the abutment shoulder for the ring.

In the modification shown in FIG. 5, the abutment projecting portion or shoulder constituted by the weld bead 5 is replaced by one of the sides $5^b$ of a groove 22 formed in the outer surface of the male end which groove is wide enough to enable the ring 9 to be disposed therein in abutment with this side or shoulder $5^b$.

Figure 6:
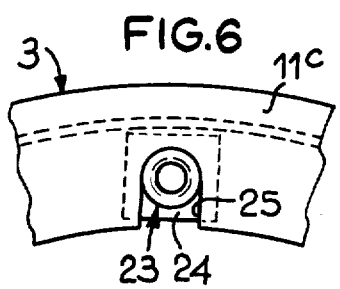
FIGS. 6 and 7 are respectively a front elevational view and a diametral sectional view of another modification concerning the screwthreaded passages in the socket flange.
Figure 7:
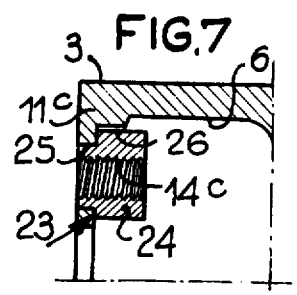

In the modification shown in FIGS. 6 and 7, the tapped apertures $14^c$ are not formed directly in the flange $11^c$ but in nuts 23 which have at one end a square outer flange 24 and are disposed in recesses 25 which are cast or moulded on the edges of the flange $11^c$ and have a shape corresponding to that of the nuts, that is to say have at one end, adjacent to the chamber 6 or 17, a square-shaped recess 26 receiving the square flange 24 of the corresponding nut.

Having now described my invention what I claim as new and desire to secure by Letters Patent is:

1. A device for effecting a tensile locking of a coupling between a pipe element having a male end and a pipe element having a socket which defines an annular space around the male end, which coupling comprises an annular sealing element which is disposed in said space, radially between said socket and male end, and is operative by a radial compression of the sealing element by the socket and the male end, said elements being capable of having an angular deviation therebetween, said device comprising a circumferentially extending flange extending radially inwardly from an entrance end of the socket and substantially closing said annular space while allowing said angular deviation in an assembled state of the coupling, means defining a shoulder integral with the male end and disposed, in said assembled state of the coupling, between the flange and the sealing element, a split ring surrounding the male end between the flange and the shoulder, and spacing means interposed between the flange and the ring and applying the ring against the shoulder and comprising means defining axial tapped passages arranged circumferentially around and carried by the flange and screws which are screwthreadedly engaged in said passages and are in bearing relation to the ring in said annular space on a side of the ring remote from the shoulder.

2. A device as claimed in claim 1, wherein said means defining the tapped passages are nuts and recesses in the flange receive said nuts which nuts are in axial abutting relation to the flange.

3. A device as claimed in claim 1, wherein the socket defines in said annular space two chambers, one chamber being a locking chamber and enclosing the ring and the shoulder and the other chamber being for the seal and containing the sealing element, an inner radial flange separates the two chambers, and a weld bead provided on the male end and defining the shoulder is in bearing relation to said inner flange between the two chambers at least at a point.

4. A device as claimed in claim 1, wherein the socket defines a single cavity defining two chambers of different diameters, the chamber of larger diameter being located adjacent an entrance end of the socket and a frustoconical ramp portion of the socket axially interconnecting the two chambers, the smaller-diameter chamber being provided for receiving the sealing element in an assembled state of the coupling after the sealing element has been forced into the smaller-diameter chamber from a waiting position in an uncompressed state in the larger-diameter chamber, and the shoulder is disposed on the male end in such position that, in an assembled state of the coupling and in respect of a maximum allowable angular deviation of the pipe elements, said shoulder is located entirely within the smaller-diameter chamber.

5. A device as claimed in claim 4, wherein the outside diameter of the ring, in a state of the ring in which it grips the male end, is less than the diameter of the smaller-diameter chamber.

6. A device as claimed in claim 4, wherein the ring has an axial dimension which is such that, in respect of a maximum allowable angular deviation of the pipe elements, said ring axially projects beyond the smaller-diameter chamber.

7. A device as claimed in claim 4, wherein the sealing element has an inner half-section in a double chamfered shape having a very wide included angle and the sealing element has a smallest inside diameter which is substantially equal to the outside diameter of the shoulder.

* * * * *